(12) United States Patent
Deshpande

(10) Patent No.: US 7,805,724 B1
(45) Date of Patent: Sep. 28, 2010

(54) APPARATUS, METHOD AND COMPUTER PROGRAM FOR DYNAMIC SLIP CONTROL IN REAL-TIME SCHEDULING

(75) Inventor: Akash Renukadas Deshpande, San Jose, CA (US)

(73) Assignee: ARC International I.P., Inc., San Jose, CA (US)

( * ) Notice: Subject to any disclaimer, the term of this patent is extended or adjusted under 35 U.S.C. 154(b) by 2054 days.

(21) Appl. No.: 10/665,875

(22) Filed: Sep. 19, 2003

Related U.S. Application Data

(63) Continuation of application No. 09/318,913, filed on May 26, 1999, now abandoned.

(60) Provisional application No. 60/086,874, filed on May 27, 1998.

(51) Int. Cl.
*G06F 9/46* (2006.01)
*G06F 13/24* (2006.01)
*G06F 3/00* (2006.01)

(52) U.S. Cl. .................. 718/102; 718/100; 710/48; 710/260

(58) Field of Classification Search ............ 718/1, 718/100, 101, 102, 103, 104, 105, 108; 711/201; 710/48, 58, 260, 263, 266
See application file for complete search history.

(56) References Cited

U.S. PATENT DOCUMENTS

| | | | | |
|---|---|---|---|---|
| 4,263,647 A | * | 4/1981 | Merrell et al. ............ 700/7 |
| 4,800,521 A | | 1/1989 | Carter et al. |
| 5,247,677 A | | 9/1993 | Welland et al. |
| 5,260,868 A | | 11/1993 | Gupta et al. |
| 5,301,312 A | | 4/1994 | Christopher et al. |
| 5,325,525 A | * | 6/1994 | Shan et al. ............ 718/104 |
| 5,392,429 A | * | 2/1995 | Agrawal et al. ............ 708/446 |
| 5,408,663 A | * | 4/1995 | Miller ............ 718/104 |
| 5,465,335 A | | 11/1995 | Anderson |
| 5,530,879 A | | 6/1996 | Crump et al. |
| 5,574,912 A | * | 11/1996 | Hu et al. ............ 712/220 |
| 5,619,409 A | | 4/1997 | Schultz et al. |
| 5,623,647 A | * | 4/1997 | Maitra ............ 713/501 |
| 5,623,677 A | * | 4/1997 | Townsley et al. ............ 713/310 |
| 5,636,124 A | | 6/1997 | Rischar et al. |
| 5,640,563 A | * | 6/1997 | Carmon ............ 718/102 |
| 5,687,381 A | * | 11/1997 | Swanstrom et al. ............ 710/269 |
| 5,701,481 A | | 12/1997 | Hosaka et al. |

(Continued)

OTHER PUBLICATIONS

Deshpande, et al., "The Shift Programming Language for Dynamic Networks of Hybrid Automata", *IEEE Transactions on Automatic Control*, Apr. 1998, 43(4): 584-587.

(Continued)

*Primary Examiner*—Meng-Ai An
*Assistant Examiner*—Abdullah Al Kawsar
(74) *Attorney, Agent, or Firm*—Ropes & Gray LLP

(57) ABSTRACT

An apparatus, method, and computer-readable program code for dynamically controlling slip is disclosed. The method monitors the time of an actual interrupt, wakes up, interacts with the physical environment, and then notes the completion time and reduces a wait period. The wait period ends in a scheduled interrupt time. By reducing the wait period based on the difference between the actual interrupt time (instead of the scheduled interrupt time) and the completion time, slip is prevented from accumulating and is reduced.

33 Claims, 4 Drawing Sheets

U.S. PATENT DOCUMENTS

| | | | |
|---|---|---|---|
| 5,781,187 A | 7/1998 | Gephardt et al. | |
| 5,784,616 A * | 7/1998 | Horvitz | 718/102 |
| 5,826,080 A * | 10/1998 | Dworzecki | 718/103 |
| 5,872,909 A | 2/1999 | Wilner et al. | |
| 5,890,134 A * | 3/1999 | Fox | 705/9 |
| 5,902,352 A * | 5/1999 | Chou et al. | 718/102 |
| 5,938,708 A | 8/1999 | Wallace et al. | |
| 5,944,778 A * | 8/1999 | Takeuchi et al. | 718/100 |
| 5,944,840 A * | 8/1999 | Lever | 714/34 |
| 5,974,439 A * | 10/1999 | Bollella | 718/104 |
| 5,995,997 A * | 11/1999 | Horvitz | 718/102 |
| 6,000,029 A * | 12/1999 | Moyer et al. | 712/244 |
| 6,105,048 A | 8/2000 | He | |
| 6,108,683 A * | 8/2000 | Kamada et al. | 718/103 |
| 6,110,220 A * | 8/2000 | Dave et al. | 716/3 |
| 6,189,070 B1 * | 2/2001 | See et al. | 711/103 |
| 6,272,517 B1 * | 8/2001 | Yue et al. | 718/102 |
| 6,279,108 B1 | 8/2001 | Squires et al. | |
| 6,341,303 B1 | 1/2002 | Rhee et al. | |
| 6,349,321 B1 * | 2/2002 | Katayama | 718/103 |
| 6,359,622 B1 | 3/2002 | Hayes-Roth | |
| 6,385,637 B1 * | 5/2002 | Peters et al. | 718/107 |
| 6,385,638 B1 * | 5/2002 | Baker-Harvey | 718/107 |
| 6,425,091 B1 | 7/2002 | Yang et al. | |
| 6,438,573 B1 * | 8/2002 | Nilsen | 718/100 |
| 6,499,050 B1 * | 12/2002 | Boswell et al. | 718/107 |
| 7,207,045 B2 * | 4/2007 | Goiffon | 718/107 |
| 7,451,447 B1 * | 11/2008 | Deshpande | 718/102 |

OTHER PUBLICATIONS

Deshpande, et al., "Viable Control of Hybrid Systems", *Hybrid Systems II*, Springer 1995.

Interrupt Driven Task Scheduler for Systems, *IBM Technical Disclosure Bulletin*, Mar. 1992, US.

* cited by examiner

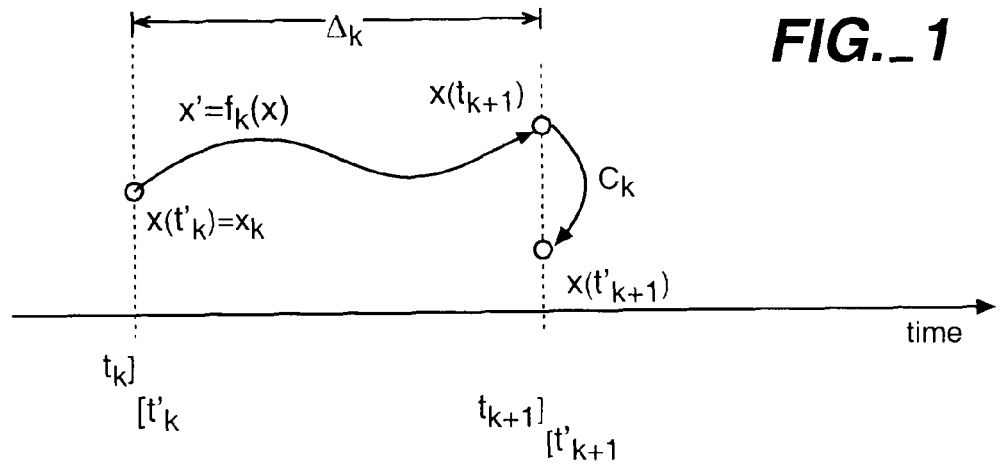
FIG._1
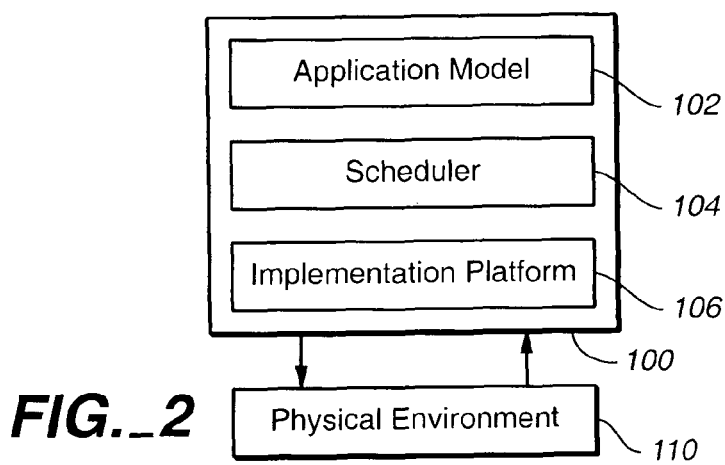
FIG._2
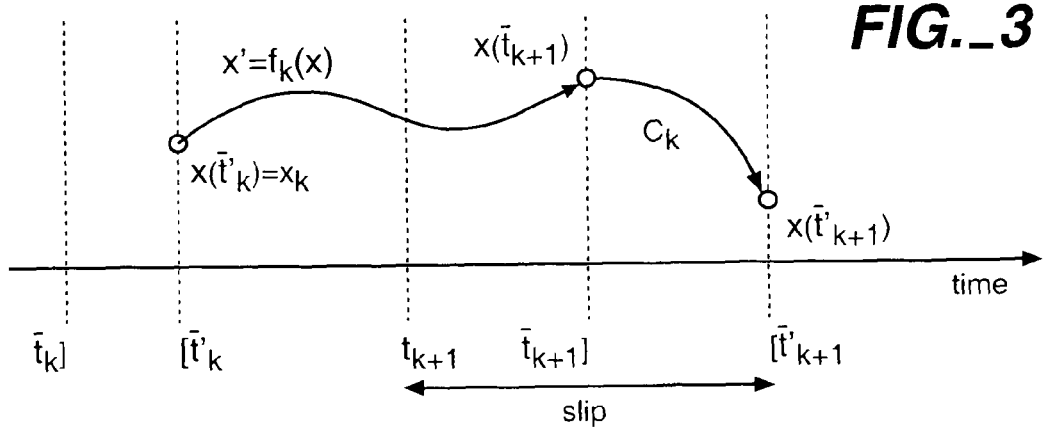
FIG._3

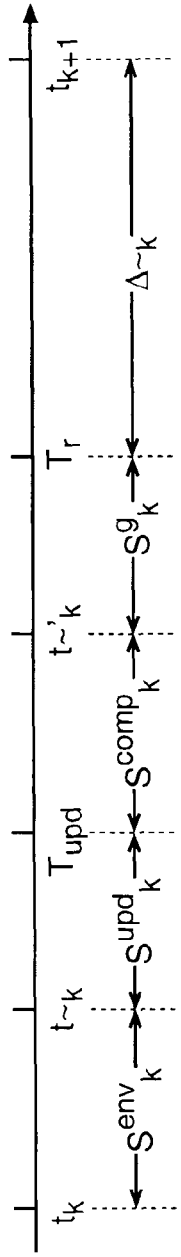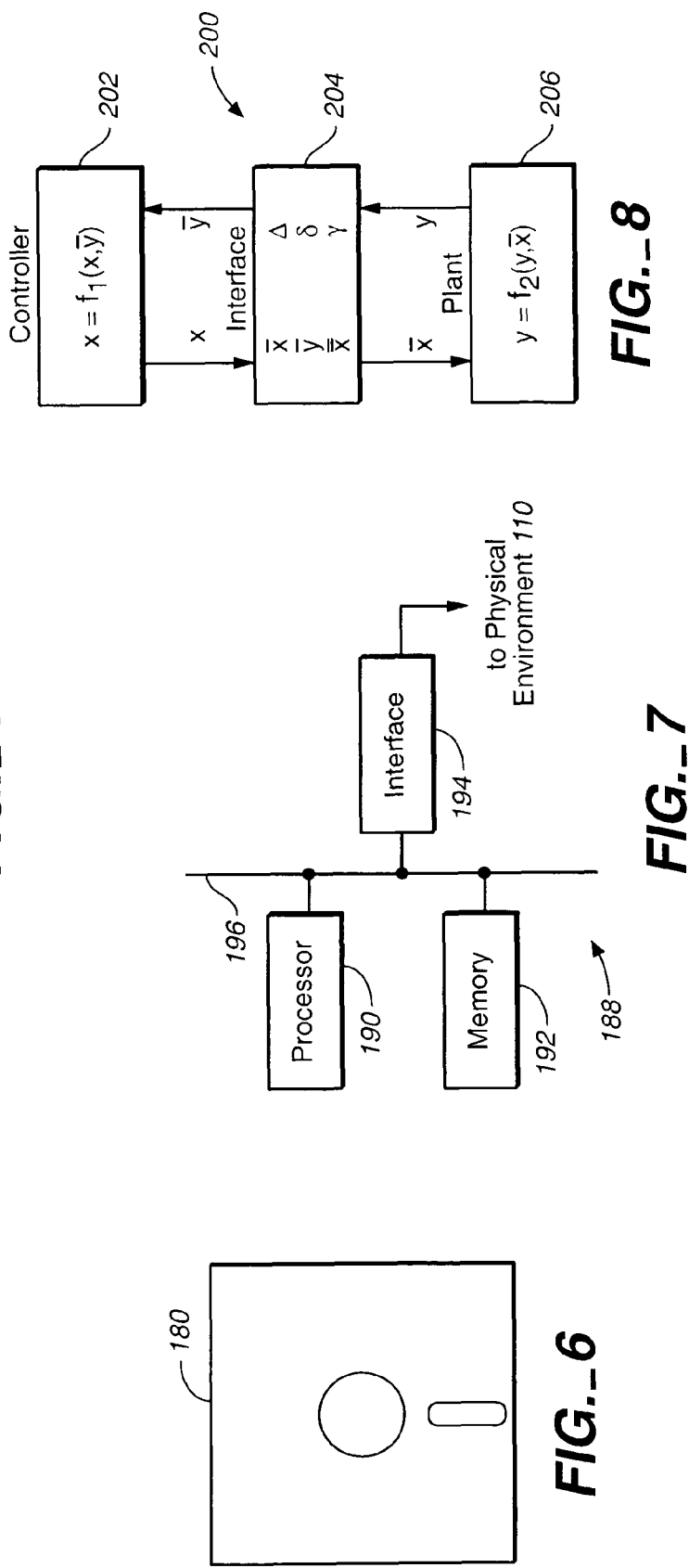

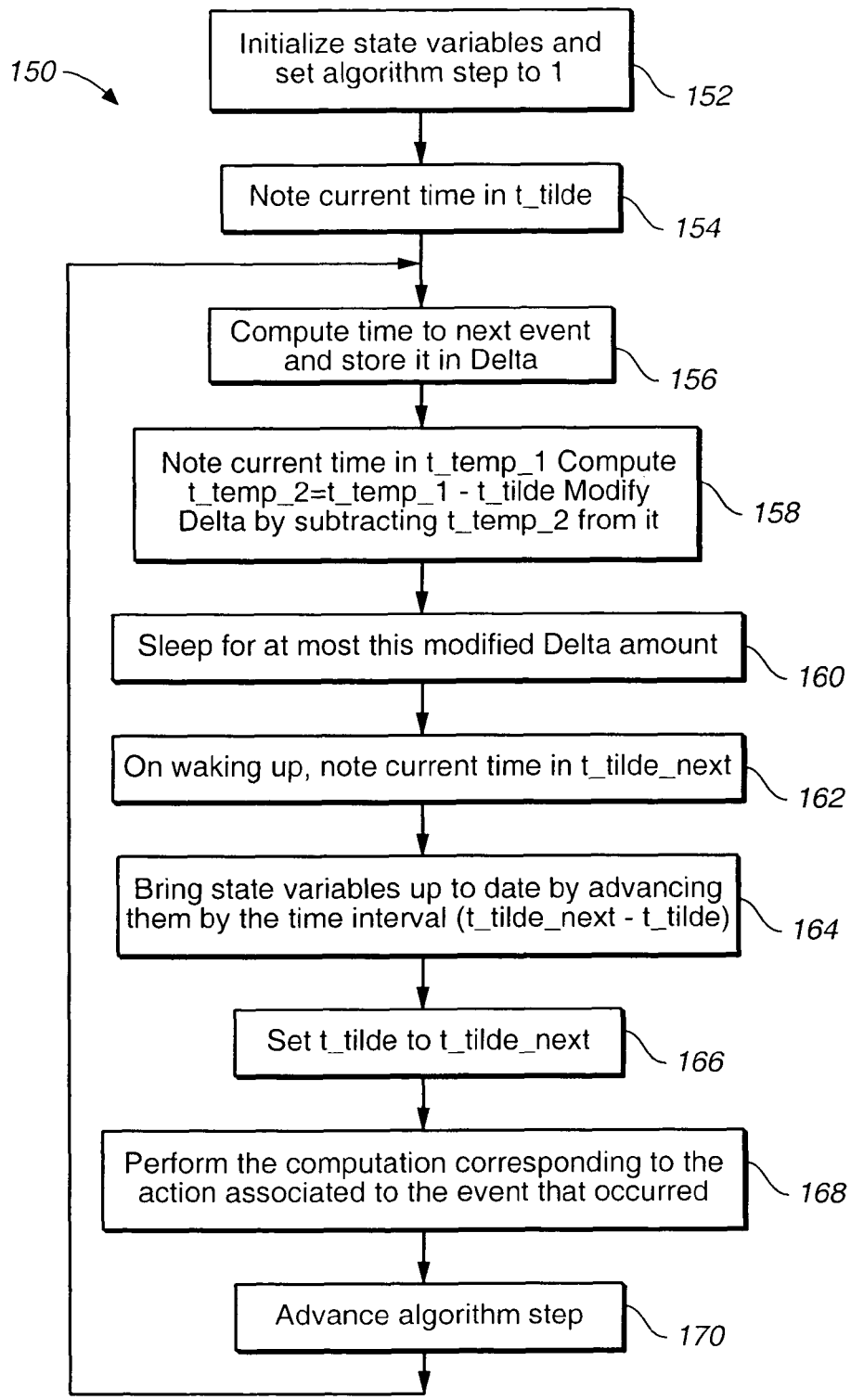
FIG._5

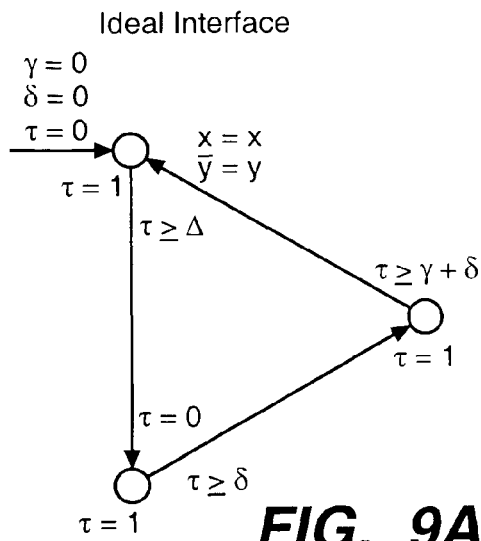
FIG._9A
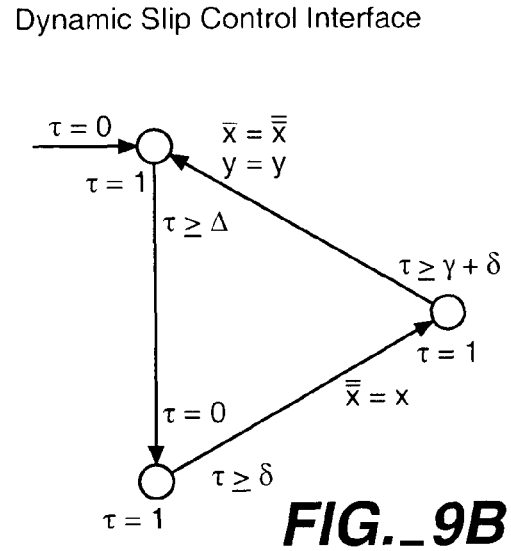
FIG._9B
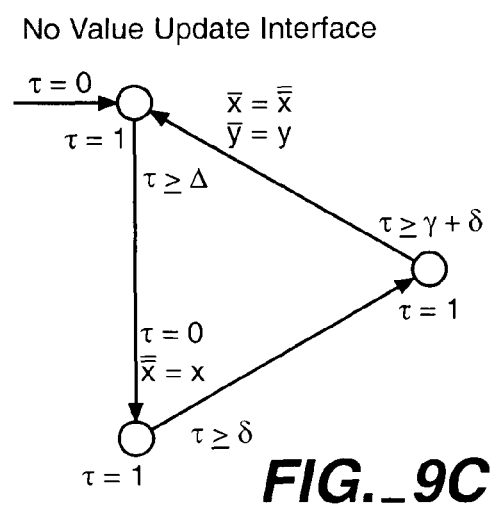
FIG._9C
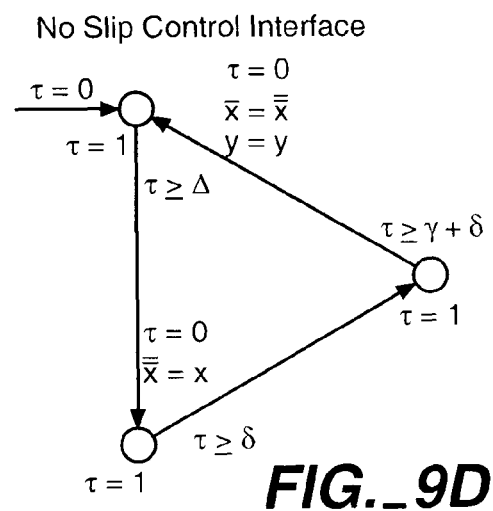
FIG._9D

APPARATUS, METHOD AND COMPUTER PROGRAM FOR DYNAMIC SLIP CONTROL IN REAL-TIME SCHEDULING

RELATED APPLICATIONS

This application is a continuation of U.S. patent application Ser. No. 09/318,913 filed on May 26, 1999, now abandoned, which claims the benefit of U.S. Provisional Application No. 60/086,874 filed on May 27, 1998. The contents of each of which are hereby incorporated by reference herein in their entirety.

BACKGROUND OF THE INVENTION

1. Field of the Invention

The present invention relates to real-time event scheduling systems. In particular, the invention relates to dynamic slip control that takes into account the actual time that events occur.

2. Description of the Related Art

Real-time systems must maintain a timely and accurate interaction with their physical environment in order to meet the overall system design objectives. The times at which the interaction occurs and the values of the system state at the interaction times are critical parts of the system performance. The further the actual interaction time is from the desired interaction time, and the further the system state value is from the desired value, the worse is the quality of the system performance.

The interaction between the real-time system and its environment may be initiated by the real-time system, which is called proactive interaction, or by the environment, which is called reactive interaction. Since the real-time system and its environment are typically distributed systems, their interactions are asynchronous.

When elapsed time does not play a role in the interaction, the situation requires discrete event scheduling only. However, when elapsed time does play a role in the interaction, the situation requires real-time event scheduling. Discrete event scheduling is usually adequate when the real-time system's internal state is purely logical or symbolic. Real-time event scheduling is necessary when the real-time system has time-dependent internal state. Some examples of systems where real-time event scheduling is necessary are observer-based control systems, discrete time observation feedback systems, and real-time simulation systems. In the first case, the real-time system filters its timed observations of the environment. In the second case, the real-time system uses timers to schedule the observation feedback computations. In the third case, the real-time system simulates the control system as well as parts or all of the physical environment.

In many implementations, real-time systems are realized simply as discrete time tasks with periodic scheduling. For example, let x be the real-time system's internal state and let $\Delta$ be the scheduling period. The variable k denotes the period number and the function $c_k$ updates the internal state to the new period number. Then, at times $$0, \Delta, 2\Delta, \ldots, k\Delta,$$

the computation $$x[k+1] = c_k(x[k])$$

is performed based on the observation at $k\Delta$.

Often, multiple such tasks are scheduled concurrently on the same real-time implementation platform, and techniques such as rate monotonic scheduling are used to guarantee the design performance of such systems. Exemplary references include C. L. Liu and J. W. Layland, *Scheduling algorithms for multiprogramming in a hard real-time environment*, 20(1) JOURNAL OF ACM 46-61 (January 1973); J. Y.-T. Leung and M. L. Merrill, *A note on preemptive scheduling of periodic, real-time tasks,* 11(3) INFORMATION PROCESSING LETTERS 115-118 (November 1980); J. Y.-T. Leung and J. Whitehead, *On the complexity of fixed-priority scheduling of periodic, real-time tasks.* 2 PERFORMANCE EVALUATION 237-250 (1982); D. W. Leinbaugh, *Guaranteed response time in a hard real-time environment,* IEEE TRANSACTIONS ON SOFTWARE ENGINEERING (January 1980); S.-C. Cheng, J. A. Stankovic, and K. Ramamritham, *Scheduling algorithms for hard real-time systems—a brief survey,* IEEE TUTORIAL HARD REAL-TIME SYSTEMS 150-173 (1988); J. Lehoczky, L. Sha, and Y. Dine, *The rate monotonic scheduling algorithm: Exact characterization and average case behavior,* PROCEEDINGS OF THE REAL-TIME SYSTEMS SYMPOSIUM 166-171 (December 1989). However, this design guarantee may not extend to the implementation of the actual system.

Because many real-time platforms may be implemented with periodic scheduling, such an approach is simple and attractive for scheduling each task. However, the periodic scheduling approach, while simple, leads to several drawbacks when implementing event scheduling models.

First, the essential asynchronous nature of the system is lost, leading to added latency in the interaction with the environment. In proactive interactions, this latency arises because the interaction time is different from the desired event time, which is typically the time at which the system's internal state crosses some guard condition. In reactive interactions, this latency arises because the interaction occurs at the end of the scheduled period even though the asynchronous interrupt may occur before the period expires.

Second, additional computational load is placed on the implementation because computations are performed periodically whether or not they are used. This additional computational load may require more expensive real-time implementation platforms.

Third, while the kth event is scheduled at time $k\Delta$, the actual time at which the event occurs is generally off from the scheduled time because of the nonideal nature of the underlying physical implementation platform. Even so, the state value at the scheduled time $k\Delta$, and not the state value at the actual event time, is used in the interaction. This leads to inaccurate interaction with the physical environment.

Given these problems, real-time event scheduling is often desired over event scheduling implemented by a periodic system. However, even if a well-designed real-time system can theoretically guarantee the timely completion of all tasks, in practice the tasks may not be completed at the desired times because of imperfections in the underlying real-time implementation platform.

The discrepancy between the actual and desired interaction times is called the slip of the system. Slip control is an algorithmic technique for ensuring that slip is small. Dynamic slip control uses the application's dynamical model information to reduce both slip and the discrepancy in the system's state values.

Traditional real-time scheduling techniques typically do not use the application's dynamical models for fine-tuning the scheduler performance. While system implementations may use physical time information for scheduling timer interrupts, they do not use physical time information to correct for slip. Thus, while they can achieve some level of slip control for simple applications with periodic schedules, generally they cannot achieve dynamic slip control for general purpose real-time event scheduling. Thus, there is a need for an algorithmic technique for dynamic slip control for real-time event scheduling.

SUMMARY OF THE INVENTION

The present invention addresses these and other problems of the prior art by providing an apparatus, method, and computer-readable program code for dynamically controlling slip.

According to one embodiment, a method according to the present invention includes the steps of detecting an actual interrupt time corresponding to an actual interrupt, interacting with a physical environment in response to the actual interrupt, and calculating a wait period based on the actual interrupt time and the interacting step. The wait period corresponds to a next scheduled interrupt time. The method further includes the step of detecting a completion time after the calculating step. The method still further includes the step of reducing the wait period calculated, based on the completion time and the actual interrupt time. The method yet further includes the step of waiting for at most the wait period as resulting from the reducing step.

According to another embodiment, a computer-readable program code according to the present invention includes a computer-readable program detection code, a computer-readable program interaction code, a computer-readable program calculation code, a computer-readable program reduction code, and a computer-readable program wait code. The computer-readable program detection code is configured to detect an actual interrupt time corresponding to an actual interrupt and to store an actual interrupt time value. The computer-readable program interaction code is configured to interact with a physical environment in response to the actual interrupt. The computer-readable program calculation code is configured to calculate a wait period based on the actual interrupt time and the computer-readable program interaction code. The wait period corresponds to a next scheduled interrupt time. The computer-readable program detection code is further configured to detect a completion time, after operation of the computer-readable program calculation code, and to store a completion time value. The computer-readable program reduction code is configured to reduce the wait period based on the completion time value and the actual interrupt time value. The computer-readable program wait code is configured to wait at most for the wait period as resulting from operation of the computer-readable program reduction code.

According to yet another embodiment, an apparatus according to the present invention includes a processor circuit, and a memory circuit. The processor circuit is configured to process instructions and data. The memory circuit is coupled to the processor circuit and is configured to store a computer-readable program code, said computer-readable program code comprising instructions and data, configured to operate with the processor circuit, and is otherwise as described above.

By reducing the wait period based on actual interrupt time (instead of scheduled interrupt time) and on the completion time, slip is prevented from accumulating and is reduced.

A better understanding of the features and advantages of the present invention will be obtained by reference to the following detailed description and accompanying drawings which set forth illustrative embodiments in which the principles of the invention are utilized.

BRIEF DESCRIPTION OF THE DRAWINGS

FIG. 1 is a graph of a state variable as a function of time for an ideal system.

FIG. 2 is a block diagram of an event scheduling system.

FIG. 3 is a graph of a state variable as a function of time for a non-ideal (i.e., real world) system.

FIG. 4 is a time line showing slip and timing events for the non-ideal system.

FIG. 5 is a flowchart of a dynamic scheduling algorithm according to an embodiment of the present invention.

FIG. 6 is a plan view of a storage medium such as a magnetic (floppy) disk or CD-ROM containing an embodiment of a computer program according to the present invention.

FIG. 7 is a block diagram of a circuit according to an embodiment of the present invention.

FIG. 8 is a block diagram of an event scheduling system used in the examples of FIGS. 9A-9D.

FIGS. 9A-9D are state diagrams corresponding to the examples applied to the system of FIG. 8.

DETAILED DESCRIPTION OF THE PREFERRED EMBODIMENTS

The following detailed description is arranged as follows. First, an ideal theoretical application modeling framework is presented. Then a three-layered implementation structure is put forward. Next, slip is defined and dynamic slip control is described. An algorithmic presentation of the dynamic slip control process is then made. Next, a theoretical example illustrates various system implementations including the dynamic slip control process. Finally, relevant portions of a C++ source code implementation are provided in an appendix.

Although this application uses the terms "hardware" and "software" to refer to the implementation of a preferred embodiment of the present invention, it is contemplated that these specific terms are not required and that the present invention may be implemented in microcode, firmware, etc. as desired.

Ideal Modeling Framework

In defining an ideal proactive scheduling framework, let $$[t'_0, t_1], [t'_1, t_2], \ldots, [t'_k, t_{k+1}], \qquad (1)$$

be a sequence of time phases with the following properties:

$$t'_0 = 0$$
$$t'_k = t_k \text{ for all } k$$
$$t_{k+1} \geq t'_k \text{ for all } k$$

Let x be the system's continuous state variable. The variable x has piecewise continuous trajectories. In the phase $[t'_k, t_{k+1}]$, let the system's dynamical model be given as $$\dot{x} = f_k(x) \qquad (2)$$

with the initial condition $x(t'_k) = x_k$.

At time $t'_k$ define $$\Delta_k = \inf\{t | g_k(x(t)) \geq 0\} \quad (3)$$

$$t_{k+1} = t'_k + \Delta_k \quad (4)$$

where the function $g_k(x(t))$ defines a guard function.

In the transition from $t_{k+1}$ to $t'_{k+1}$, the following computation is performed:

$$x(t'_{k+1}) = c_k(x(t_{k+1})) \quad (5)$$

We will interpret the execution of this computation as an interaction of the system with the physical environment. We will treat $t'_{k+1}$ as the time at which this interaction occurs. The state information at time $t_{k+1}$ is used for the interaction.

Then, define the value sequence corresponding to the phase sequence (1) as $$(x(t'_0), x(t_1)), (x(t'_1), (x(t_2)), \ldots, (x(t'_k), x(t_{k+1}))), \quad (6)$$

FIG. 1 shows the kth phase in this setting.

This model is derived from a hybrid system model with switched flow equations and guarded transitions with actions. The hybrid system model is described in R. Alur, C. Courcoubetis, T. Henzinger, and P. Ho, *Hybrid Automatia: An Algorithmic Approach to the Specification and Verification of Hybrid Systems*, HYBRID SYSTEMS, (LNCS 736) 209-229 (Springer-Verlag 1993); A. Deshpande and P. Varaiya, *Viable Control of Hybrid Systems*, HYBRID SYSTEMS H (LNCS 999) (Springer-Verlag, 1995); and A. Deshpande, A. Gollu and L. Semenzato, *The Shift Programming Language and Run-time System for Dynamic Networks of Hybrid Systems*, IEEE TRANSACTIONS ON AUTOMATIC CONTROL: SPECIAL ISSUE ON HYBRID SYSTEMS (May 1998).

In defining an ideal reactive scheduling framework, let $I_k \geq t'_k$ be the time at which the physical environment interrupts the application given that the kth event has already occurred.

Then, equation (4) is modified as $$t_{k+1} = \min(t'_k \Delta_k, I_k) \quad (7)$$

Further, the computation to be performed at the kth event may depend on the type of interrupt (proactive vs. reactive) that caused it. Let $\tau_k$ be the type of the interrupt. Then, equation (5) is modified as $$x(t'_{k+a}) = c_k(\tau_k, x(t_{k+1})) \quad (8)$$

Implementation Structure

FIG. 2 shows an implementation of an event scheduling system 100, including application software 102, scheduling software 104, and implementation platform 106. The event scheduling system 100 interacts with a physical environment 110.

Application software 102 contains the functional description of the specific application model, namely, the variable x, and the functions $f_k$, $g_k$, and $c_k$.

Scheduling software 104 contains the algorithmic description of the event scheduler, namely, the computational procedure for taking the transitions from $t_k$ to $t'_k$ and from $t'_k$ to $t_{k+1}$, and for evaluating $t_{k+1}$, the next event time. Scheduling software 104 is more fully described below with reference to FIG. 5 and the accompanying text.

Implementation platform 106 contains the hardware and software platform that provides the real-time implementation services, namely, physical time information, timer and environment interrupt delivery, and numerical processing.

Physical environment 110 is the real-world system with which event scheduling system 100 interacts. Such interaction may be in the form of signals from physical environment 110 indicating its state, and signals from event scheduling system 100 to which physical environment 110 is to respond. This response may include modifying its state, thereby forming a dynamic feedback loop.

Slip

Let $$[\tilde{t}'_0, \tilde{t}_1], [\tilde{t}'_1, \tilde{t}_2], \ldots, [\tilde{t}'_k, \tilde{t}_{k+1}], \quad (9)$$

be a sequence of slipped time phases with the following properties:

$$\tilde{t}'_0 \geq 0$$

$$\tilde{t}'_k \geq \tilde{t}_k \text{ for all } k$$

$$\tilde{t}'_{k+1} \geq \tilde{t}'_k \text{ for all } k$$

Define slip $S_k$ as the interval between the occurrence of interaction with the physical environment and the scheduled time of that interaction:

$$S_k = \tilde{t}'_k - t'_k \quad (10)$$

Slip arises from internal factors such as unaccounted processing time as well as external factors such as inaccurate delivery of timer interrupts by the real-time platform. Let $s_k$ be the slip during the kth phase. The slip $s_k$ arises due to processing and interrupt latency associated with the kth event only. Then, unless special care is taken to account for it, slip could accumulate as $$S_k = \sum_{i=0}^{k} S_i \quad (11)$$

Another effect of inadequate slip control is that the interaction with the physical environment can be based on out-of-date state values. Typically, the value sequence (6) is used in conjunction with the slipped time phase sequence (9), leading to inaccurate interaction with the environment.

Dynamic Slip Control

There are three objectives of slip control. The first is to ensure that slip does not accumulate; i.e., that $S_k$ is independent of k. The second is to ensure that slip is small; i.e., that $S_k$ is as close to zero as possible. The third is to ensure that the interaction with the physical environment is based on up-to-date state values; i.e., that the value sequence is $$(x(\tilde{t}'_0), x(\tilde{t}_1)), (x(\tilde{t}'_1), (x(\tilde{t}_2)), \ldots, (x(\tilde{t}'_k), x(\tilde{t}_{k+1}))), \quad (12)$$

FIG. 3 shows the kth phase in this setting. Define the following quantities:

$S_k^{env}$—random latency introduced by the real-time platform in delivering an interrupt $S_k^{upd}$—processing time required to integrate the system state flow equation (2)

$S_k^{comp}$—processing time required to compute the state update computation, equation (5)

$S_k^g$—processing time required to compute $t_k$ [see equations (3) and (4)]

$\tilde{\Delta}_k$—time interval to the next timer interrupt

Suppose that the kth timer interrupt is scheduled for time $t_k$. Implementation platform 106 will deliver the interrupt to scheduling software 104 at $$\tilde{t}_k = t_k + S_k^{env}$$

At the time $$T_{upd} = \tilde{t}_k + S_k^{upd}$$

scheduling software 104 will complete the state variable update to time $\tilde{t}_k$, yielding $x(\tilde{t}_k)$. At the time $$\tilde{t}'_k = T_{upd} + S_k^{comp}$$

system 100 will complete interacting with the physical environment 110, yielding $x(\tilde{t}'_k)$. At the time $$T_r = \tilde{t}'_k + S_{k+1}^g$$

scheduling software 104 will complete the computation of $\Delta_{k+1}$. Scheduling software 104 will compute $$\tilde{\Delta}_k = \Delta_k - (T_r - \tilde{t}_k)$$

and set the timer interrupt to occur after $\tilde{\Delta}_k$. This ensures that the (k+1)st timer interrupt is scheduled for time $t_{k+1}$.

FIG. 4 shows these timing components. Scheduling software 104 obtains from implementation platform 106 $\tilde{t}_k$ and $T_r$, which are readings of the physical, real-world time.

Note that slip is $$S_k = S_k^{env} + S_k^{upd} + S_k^{comp} \quad (13)$$

Note the following characteristics of equation (13). First, since the right hand side of equation (13) is independent of any cumulative effects, this procedure ensures that slip does not accumulate.

Second, the magnitude of the slip in equation (13) can be reduced by reducing one or more of $S_k^{env}$, $S_k^{upd}$ and $S_k^{comp}$. In addition, slip can be reduced by estimating each of these contributing factors and then accounting for them in the computation of $\tilde{\Delta}_k$. The estimation can be accomplished either by analyzing the performance of the real-time platform and the application model in an off-line manner, or by maintaining statistical performance information in an on-line manner.

Third, the computation at $\tilde{t}'_k$ is based on state values at $\tilde{t}_k$ and not at $t_k$, ensuring accurate interaction with the physical environment.

Fourth, the slip component $S_k^g$ is removed altogether from equation (13) because $\tilde{\Delta}_k$ takes the physical time reading $T_r$ into account.

This approach to dynamic slip control works because it uses two important elements: information about the application models and information about the physical time at critical points in the execution cycle.

Because this approach to real-time event scheduling uses the value sequence (12), care must be taken in programming the computations $c_k$ in the model.

For example, consider a simple system in which $x \in R$, $f_k(x)=1$, $x_0=0$, guard crossing is triggered whenever $x \geq \Delta$, and $c_k$ assigns 0 to x. Ideally, in this system, an event is scheduled at each $k\Delta$.

Now, let $S_k^{env} = \delta$ for each k. Then, in fact, events will be scheduled at times $k(\Delta+\delta)$, leading to increasing slip.

The correct modeling of the computation $c_k$ is to assign $x-\Delta$ to x. Thus, with $S_k^{env}=\delta$, the value of x after $c_k$ will be $\delta$. This leads to interrupts being scheduled at each $k\Delta$ as desired, and the slip is always $\delta$, which is unavoidable. Note that slip does not accumulate.

Algorithm for Dynamic Slip Control

We will assume that the real-time platform provides the function current_time( )

to obtain the value of physical time at the time of the call, and the function $\tau$=set_interrupt_timer(T)

to set the timer interrupt to occur T seconds after the call. The effect of set_interrupt_timer(T) is to suspend the algorithm until either the timer interrupt or the interrupt from the physical environment occurs, after which execution is resumed. The function returns the type of interrupt which caused the execution to be resumed.

We will assume that the scheduler provides the function next_event_time(k,x)

which solves for $\tilde{\Delta}_k$, the function update(k,T)

which integrates equation (2) forward by time T, and the function computer($\tau$,k,x)

which invokes the computation (8).

We will assume that the initial slip $S_0=0$. Following is pseudocode for the scheduler algorithm.

$x=x_0$ $t$=current_time( )

k=1 forever {

$\Delta$=next_event_time(k,x)

$\tau$=set_interrupt_timer($\Delta$-(current_time( )-$\tilde{t}$))

$\tilde{t}_{next}$=current_time( )

$x$=update(k,($\tilde{t}_{next}-\tilde{t}$))=

$\tilde{t}=\tilde{t}_{next}$ $x$=compute($\tau$,k,x)

$k=k+1$

}

This pseudocode is detailed with reference to FIG. 5, which provides a flowchart of a dynamic scheduling method 150 corresponding to this pseudocode. (The components that perform these functions are parts of event scheduling system 100 in FIG. 2.)

In step 152, the state variables x and t are initialized by application software 102 and scheduling software 104, respectively, and scheduling software 104 sets the counter k to 1. In step 154, implementation platform 106 notes the current time and scheduling software 104 stores this value as $\tilde{t}$. In step 156, scheduling software 104 computes the time to the next event and stores this value as $\Delta$.

In step 158, implementation platform 106 notes the current time and scheduling software 104 stores this value as $T_r$. That is, the computation of step 156 takes an amount of time equal to the difference between $T_r$ and $\tilde{t}$. This difference is represented by the period $S_k^e$ in FIG. 4. Then, scheduling software 104 computes this difference by subtracting $\tilde{t}$ from $T_r$. Finally, scheduling software 104 modifies $\Delta$ by subtracting this difference.

In step 160, scheduling software 104 instructs implementation platform 106 of the modified $\Delta$ time period, and scheduling software 104 and application software 102 then enters a sleep or inactive mode.

In step 162, implementation platform 106 generates an interrupt, ending the sleep period of step 160. If implementation platform 106 generates a reactive interrupt, that is, an interrupt from physical environment 110, the sleep period ends prematurely. If implementation platform 106 generates a proactive interrupt, that is, on expiration of the modified $\Delta$ time period, then the sleep period ends as scheduled, as modified by the slip $S_k^{env}$ (see FIG. 4 and accompanying text) caused by the random latency of physical environment 110. Then, implementation platform 106 notes the current time and scheduling software 104 stores this value as $\tilde{t}_{next}$.

In step 164, scheduling software 104 instructs application software 102 to update the state variables corresponding to physical environment 110. Application software 102 then updates the state x using the function $f_k(x)$. As noted in FIG. 4 and the accompanying text, this takes an amount of time corresponding to the slip $S_k^{upd}$.

In step 166, scheduling software 104 replaces the stored $\tilde{t}$ with $\tilde{t}_{next}$ in preparation for the incrementation of k when the algorithm is repeated. Note that step 166 is not required to be located between steps 164 and 168, and may be performed at any time prior to the next time $\tilde{t}$ is used (that is, in step 168).

In step 168, scheduling software 104 instructs application software 102 to update the state variables corresponding a desired action in relation to physical environment 110. Application software 102 then computes the modified state $x_{k+1}$ using the function $c_k$. This may also involve implementation platform 106 passing the updated state variables to physical environment 110. As noted in FIG. 4 and the accompanying text, step 168 takes an amount of time corresponding to the slip $S_k^{comp}$.

In step 170, scheduling software 104 increments k, and loops back to step 156.

Source code in C++ language implementing this algorithm is contained in the Appendix.

FIG. 6 shows that object or executable code corresponding to scheduling software 104 may be embodied on a computer-readable medium such as a floppy disk 180 or CD-ROM.

FIG. 7 shows that event scheduling system 100 may be implemented as part of a system-on-a-chip 188. System 188 includes a processor circuit 190 (which has an internal timer circuit), a memory circuit 192, and an interface circuit 194. A bus 196 interconnects these components. Application software 102 and scheduling software 104 may be stored in memory circuit 192 and executed by processor circuit 190. Processor circuit 190 may also control the other components on system 188. Interface circuit 194 provides the connection to the physical environment 110.

EXAMPLE

FIG. 8 is a representative system 200 that will be used in an example comparing the dynamic slip control system of the present invention with other control systems. System 200 includes a controller block 202, an interface block 204, and a physical system block 206. Controller block 202 implements application software 102 and scheduling software 104. Interface block 204 represents the non-idealities inherent in interacting with physical system 206.

The controller equation is $$\dot{x} = f_1(x, \bar{y})$$
$$= x - \bar{y}$$
$$x(0) = 1$$

where x is the controller's internal state and $\bar{y}$ is the sampled and held physical system observation. The physical system equation is $$\dot{y} = f_2(y, \bar{x})$$
$$= -1 + \bar{x}$$
$$y(0) = 0$$

where y is the physical system's internal state and $\bar{x}$ is the sampled and held controller command.

Models of four interfaces are shown in FIGS. 9A-9D. The ideal interface of FIG. 9A delivers the interrupt at each $k\Delta$ and instantaneously transfers the values of x and y to $\bar{x}$ and $\bar{y}$, respectively.

The dynamic slip control interface of FIG. 9B delivers interrupts at $k\Delta+\delta$. It transfers the value of x at $k\Delta+\delta$ and the value of y at $k\Delta+\delta+\gamma$.

The no value update interface of FIG. 9C delivers interrupts at $k\Delta+\delta$. It transfers the value of x at $k\Delta$ and the value of y at $k\Delta+\delta+\gamma$.

The no slip control interface of FIG. 9D delivers interrupts at $k(\Delta+\delta+\gamma)$. It transfers the value of x at $k(\Delta+\delta+\gamma)+\delta$ and the value of v at $k(\Delta+\delta+\gamma)+\delta+\gamma$.

The parameter values for the example were chosen as $$\Delta = 20 \text{ ms}$$
$$\delta = 3 \text{ ms}$$
$$\gamma = 1 \text{ ms}$$

Each interface of the system was modeled, simulated and analyzed using the DIADEM real-time software tools and platforms. See A. Deshpande, *The DIADEM System for Real-Time Dynamic Event Management*, LNCS PROCEEDINGS OF THE 1997 NATO WORKSHOP ON DISCRETE EVENT AND HYBRID SYSTEMS (Springer-Verlag 1997). The DIADEM software is available from Teja Technologies, Inc., Richmond, Calif.

For this example, the error in the case of no value update interface is about five times worse than the error in the case of dynamic slip control interface, and the error in the case of no slip control interface is about five times worse than the error in the case of no value update interface.

CONCLUSION

The above-described embodiments of the present invention reduce slip in real-time event scheduling systems, thereby improving performance of those systems. Slip is reduced by setting a wait period based on the difference between the actual interrupt time (instead of the scheduled interrupt time) and the completion time of various interactions and calculations.

It should be understood that various alternatives to the embodiments of the invention described herein may be employed in practicing the invention. It is intended that the following claims define the scope of the invention and that structures within the scope of these claims and their equivalents are covered thereby.

What is claimed is:

1. A method for dynamic slip control in a scheduling system, the method comprising:
   a processor receiving a first interrupt;
   the processor retrieving from a memory a value of a first clock time when the first interrupt is received;
   the processor computing an estimated scheduled time interval to a second interrupt;
   the processor retrieving from the memory a value of a second clock time when computation of the estimated scheduled time interval is complete;
   the processor computing a first time interval between said first clock time value and the estimated scheduled time interval to the second interrupt;
   the processor computing a second time interval between said first clock time value and said second clock time value;
   the processor computing a revised scheduled time interval by subtracting said second time interval from said first time interval; and
   the processor scheduling said second interrupt to arrive at or after an expiration of said revised scheduled time interval.

2. A method according to claim 1, further comprising: after the act of obtaining the value of a first clock time when the first interrupt is received and before the act of obtaining the value of a second clock time when computation of the first time interval is complete, updating a state variable of said scheduling system.

3. A method according to claim 1, further comprising: after the act of obtaining the value of a first clock time when the first interrupt is received and before the act of obtaining the value of a second clock time when computation of the first time interval is complete, interacting with a physical environment via an interface circuit.

4. A method according to claim 3, wherein said act of interacting with the physical environment comprises receiving a signal from the physical environment indicative of a state of the physical environment.

5. A method according to claim 3, wherein said act of interacting with the physical environment comprises receiving an instruction from the physical environment to modify a state of the scheduling system.

6. A method according to claim 1, further comprising estimating a latency of receipt of said first interrupt, and wherein said act of computing said second and said revised scheduled time intervals is further based on said estimated latency.

7. A method according to claim 6, wherein said first interrupt is received from a first platform and the act of estimating said latency comprises analyzing a performance characteristic of said platform.

8. A method according to claim 6, wherein said first interrupt is received from a first platform and the act of estimating said latency comprises accessing statistical information regarding a performance characteristic of said platform.

9. A method according to claim 1, further comprising estimating a processing time for updating a state of said scheduling system, and wherein said act of computing said second and said revised scheduled time intervals is further based on said estimated time.

10. A method according to claim 9, wherein the act of estimating said processing time comprises analyzing a performance characteristic of said scheduling system.

11. A method according to claim 9, wherein the act of estimating said processing time comprises accessing statistical information regarding a performance characteristic of said scheduling system.

12. A computer program product for use with a scheduling system comprising a computer readable medium encoded with a program module, the program module including instructions for directing the scheduling system to:
    receive a first interrupt;
    obtain a value of a first clock time when the first interrupt is received;
    compute an estimated scheduled time interval to a second interrupt;
    obtain a value of a second clock time when computation of the estimated scheduled time interval is complete;
    compute a first time interval between said first clock time value and the
    estimated scheduled time interval to the second interrupt;
    compute a second time interval between said first clock time value and said second clock time value;
    compute a revised scheduled time interval by subtracting said second time interval from said first time interval; and
    schedule said second interrupt to arrive at or after an expiration of said revised scheduled time interval.

13. A computer program product according to claim 12, wherein the program module further includes instructions directing the scheduling system to update a state variable of said scheduling system after the act of obtaining the value of a first clock time when the first interrupt is received and before the act of obtaining the value of a second clock time when computation of the first time interval is complete.

14. A computer program product according to claim 12, wherein the program module further includes instructions directing the scheduling system to interact with a physical environment via an interface circuit after the act of obtaining the value of a first clock time when the first interrupt is received and before the act of obtaining the value of a second clock time when computation of the first time interval is complete.

15. A computer program product according to claim 14, wherein said instructions directing the scheduling system to interact with the physical environment comprise instructions directing the scheduling system to receive a signal from the physical environment indicative of a state of the physical environment.

16. A computer program product according to claim 14, wherein said instructions directing the scheduling system to interact with the physical environment comprise instructions directing the scheduling system to receive an instruction from the physical environment to modify a state of the scheduling system.

17. A computer program product according to claim 12, wherein the program module further includes instructions directing said scheduling system to estimate a latency of receipt of said first interrupt, and wherein said instructions directing the scheduling system to compute said second and said revised scheduled time intervals further include instructions to compute said second time interval based on said estimated latency.

18. A computer program product according to claim 17, wherein said first interrupt is received from a first platform and the instructions directing said scheduling system to estimate said latency comprise instructions directing said scheduling system to analyze a performance characteristic of said platform.

19. A computer program product according to claim 17, wherein said first interrupt is received from a first platform and the instructions directing said scheduling system to estimate said latency comprise instructions directing said scheduling system to access statistical information regarding a performance characteristic of said platform.

20. A computer program product according to claim 12, wherein the program module further comprises instructions directing the scheduling system to estimate a processing time for updating a state of said scheduling system, and wherein said instructions directing the scheduling system to compute said second time interval further include instructions to computer said second and said revised scheduled time intervals based on said estimated time.

21. A computer program product according to claim 20, wherein the instructions directing the scheduling system to estimate said processing time include instructions directing the scheduling system to analyze a performance characteristic of said scheduling system.

22. A computer program product according to claim 20, wherein the instructions directing the scheduling system to estimate said processing time comprise instructions directing the scheduling system to access statistical information regarding a performance characteristic of said scheduling system.

23. A scheduling system employing dynamic slip control, the scheduling system comprising:
   at least one input configured to receive an interrupt;
   at least one timer circuit; and
   a processor coupled to said timer circuit and said input, the processor configured to obtain
a value of a first clock time when a first interrupt is received, compute an estimated scheduled time interval to a second interrupt, obtain a value of a second clock time when computation of the estimated scheduled time interval is complete, compute a first time interval between said first clock time value and the estimated scheduled time interval to the second interrupt, compute a second time interval between said first clock time value and said second clock time value, compute a revised scheduled time interval by subtracting said second time interval from said first time interval, and schedule said second interrupt to arrive at or after an expiration of said revised scheduled time interval.

24. A system according to claim 23, wherein the processor is further adapted configured to update a state variable of said scheduling system after the act of obtaining the value of a first clock when the first interrupt is received and before the act of obtaining the value of a second clock time when computation of the first time interval is complete.

25. A system according to claim 23, further comprising a physical environment coupled to said processor and wherein the processor is further configured to interact with the physical environment via an interface circuit after the act of obtaining the value of a first clock time when the first interrupt is received and before the act of obtaining the value of a second clock time when computation of the first time interval is complete.

26. A system according to claim 25, wherein the processor is further configured to receive a signal from the physical environment indicative of a state of the physical environment.

27. A system according to claim 25, wherein the processor is further configured to receive an instruction from the physical environment to modify a state of the scheduling system.

28. A system according to claim 23, wherein the processor is further configured to estimate a latency of receipt of said first interrupt, and compute said second and said revised scheduled time intervals based further on said estimated latency.

29. A system according to claim 28, further comprising a platform configured to send said first interrupt, said processor further configured to analyze a performance characteristic of said platform.

30. A system according to claim 28, further comprising a platform configured to send said first interrupt, said processor further configured to access statistical information regarding a performance characteristic of said platform.

31. A system according to claim 23, wherein the processor is further configured to estimate a processing time for updating a state of said scheduling system, and compute said second and said revised scheduled time intervals based further on said estimated time.

32. A system according to claim 31, said processor further configured to analyze a performance characteristic of said scheduling system.

33. A system according to claim 31, said processor further configured to access statistical information regarding a performance characteristic of said scheduling system.

* * * * *